United States Patent [19]
Illing

[11] 3,719,804
[45] March 6, 1973

[54] PERMANENT INFORMATION STORE

[75] Inventor: David Anthony Illing, Stoke-on-Trent, England

[73] Assignee: International Computers Limited, London, England

[22] Filed: June 15, 1971

[21] Appl. No.: 153,301

[30] Foreign Application Priority Data

March 26, 1971 Great Britain........................8,234/71

[52] U.S. Cl. .235/61.12 N, 340/149 A, 235/61.11 H, 235/61.12 R
[51] Int. Cl.............................................G06k 19/06
[58] Field of Search..235/61.12, 61.11 H; 340/149 A

[56] References Cited

UNITED STATES PATENTS

| | | | |
|---|---|---|---|
| 3,404,382 | 10/1968 | Rosenheck et al. | 235/61.11 H |
| 2,373,540 | 4/1945 | Carver | 235/61.12 N |
| 2,545,804 | 3/1951 | Butler | 235/61.12 N |
| 3,123,706 | 3/1964 | French | 235/61.11 H |

*Primary Examiner*—Thomas A. Robinson
*Assistant Examiner*—Joseph M. Thesz, Jr.
*Attorney*—Keith Misegades et al.

[57] ABSTRACT

A permanent information storage device has a hidden conductive pattern of first areas selectively connected to a second area. Reading is by energizing capacitive couplings to the first areas and detecting for response in the second area.

5 Claims, 2 Drawing Figures

PERMANENT INFORMATION STORE

BACKGROUND OF THE INVENTION

The invention relates to permanent information storage.

Typical of small permanent storage devices are pocket-sized "badges" which bear information for identification purposes.

Badges are normally used in conjunction with a reader for providing signals representative of the information stored by a badge, and means responsive to certain predetermined information, say for enabling associated apparatus, such as a processor terminal, for use. This limits such use to the processor of an appropriate badge. A badge can also be used to identify a certain class or type of input information or function required.

Punched cards have been used as badges, but are easy to copy and so are not wholly satisfactory where high security is required against unauthorized use.

SUMMARY OF THE INVENTION

According to one aspect of the invention there is provided a permanent storage device having under a non-conductive layer a conductive arrangement modifiably by removal of at least one part thereof to have a desired capacitive intercoupling action with respect to signals applied to an interrogating conductive arrangement when the latter is adjacent the layer.

Preferably, said part serves to interconnect a first conductive areas with a second conductive area, each for capacitively coupling with different areas of said interrogating arrangement of which only that coupled to said first area receives said signals. In use with a said interrogating conductive arrangement, a first capactive coupling to which said signals are applied and said second area is included in a second capacitive coupling, so replicas of said signal will be returned via the second coupling only if the part interconnecting said first and second areas is intact.

Said first area may be one of a set of discrete areas each having a distinct said part extending therefrom. This permits a digital output to be obtained if those parts of the interrogating arrangement corresponding to the areas of the set are separately energized by said signals. Said second conductive area may be common to each said part.

According to another aspect of the invention there is provided a permanent storage device having under a non-conductive layer a conductive arrangement including a plurality of conductive areas each for cooperating with a distinct area of an interrogating conductive arrangement to form a capacitor when the latter arrangement is adjacent the layer, one of said plurality of conductive areas being connected by distinct conductive parts to all but predetermined ones of the other areas of said plurality.

The conductive arrangements of devices embodying the invention are well suited to printed circuit realization. A covering layer of suitable plastics material can hide the conductive arrangement from sight. The particular conductive configuration will not be apparent and the cards will not be readily available so security is high. Some precoding can be included in manufacture of the printed circuit.

BRIEF DESCRIPTION OF THE DRAWINGS

One embodiment of the invention will now be described by way of example, with reference to the accompanying drawings, in which.

DESCRIPTION OF THE PREFERRED EMBODIMENTS

Figure 1:
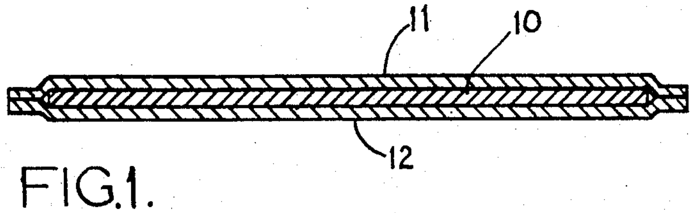
FIG. 1 is a section through a badge.

The badge shown in FIG. 1 comprises a flexible printed circuit board 10 sandwiched between two opaque layers 11 and 12 of plastics material that are joined together at their edges, for example by seam welding or glueing. The upper layer 11 may differ by having desired dielectric properties.

Figure 2:
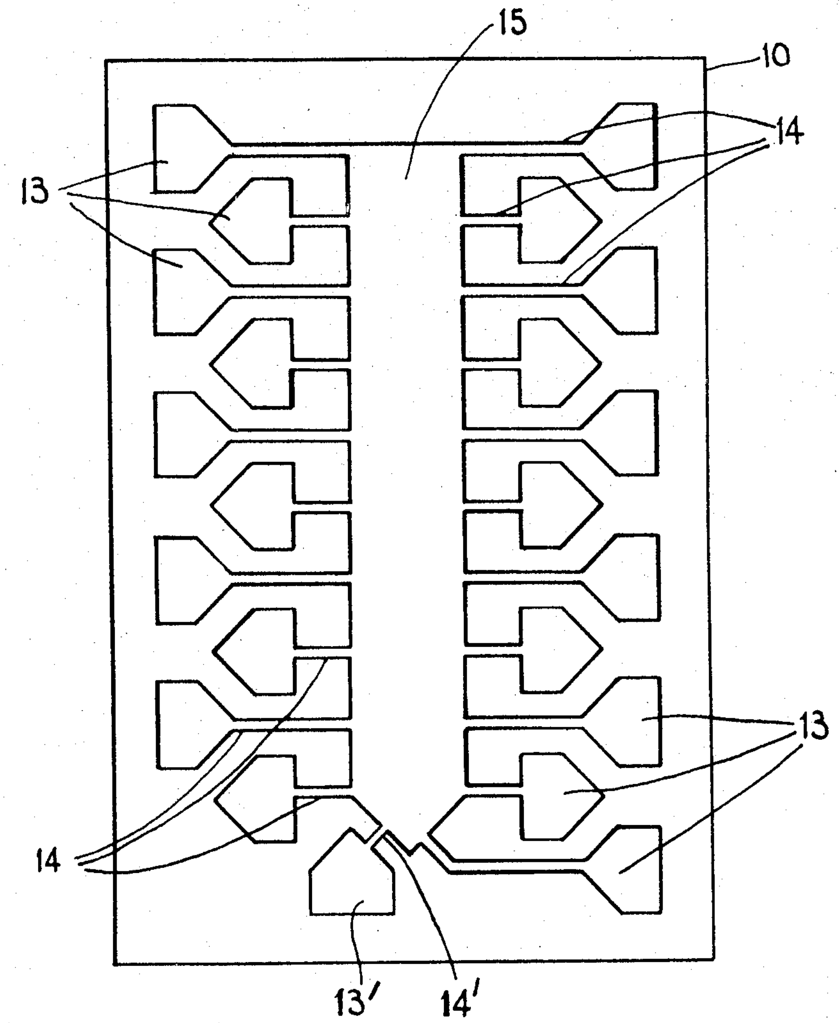
FIG. 2 is a plan view of the conductive arrangement of the badge of FIG. 1.

The board 10 carries, on one surface, a conductive arrangement as shown in FIG. 2. The arrangement has a plurality of small conductive areas 13. Each of these areas 13 has a conductive connecting part 14 extending therefrom. The connecting parts 14 all extend to a large central conductive area 15.

Information is entered on the badge by breaking selected ones of the connecting parts 14. This may be done in any convenient way, for example punching through the sandwich 10, 11, 12, or punching through only the printed circuit board 10, or removing some of a part 14 perhaps by scraping.

A reader for such a badge includes an interrogating printed circuit pattern of conductive areas in a mirror image of the areas 13 and 15 shown in FIG. 2. However these areas are not interconnected, i.e. there are no parts corresponding to the connecting parts 14 of FIG. 2. Instead, the areas of the interrogating pattern are separately connected to different terminals.

In operation, those terminals connected to small areas corresponding to the areas 13 are energized in predetermined order for successive intervals of time by a periodic signal. Individual logically controlled driver circuits may be used to apply a suitable signal such as a high frequency square-wave.

The reader will have a badge receiving position for locating a badge to be read in juxtaposition with the interrogating pattern. In this position, capacitances for the small areas of a few picofarads have been found adequate in conjunction with a square-wave of about 15 volts amplitude.

The large central area of the interrogating pattern is connected to a receiver and detector circuit. For preferred digital operation the detector output will have one of two values depending on whether or not a signal is received.

It is preferred for at least one small area, e.g. that designated 13' in FIG. 2, to be used for verifying whether a badge is correctly located in the reader. The connecting part 14' of such an area will always be left intact. The sequence of energization of the areas coupling with the small area 13 begins only if that coupled to the small area 13' causes return of the signal.

The illustrated badge has a twenty-one bit information capacity. One way of handling these bits at the receiver is to consider it as three successive sets of seven bits and to generate a parity bit for each set. Then a data stream of three words of eight bits is available if required. The parity bits only may be used for enabling terminal use, with the value of each seven bit word having a particular significance, each word relating to a different type of information.

It is not necessary to divide into three words. Any other or no, division is possible. At least a part of the badge printed circuit may be precoded during manufacture by omission of one or more of the connecting parts 14. The corresponding bits might represent a location, grade of user, or type of use or information. Different sets of resulting badges could still have a part reserved for entering further information, for example, by punching.

I claim:

1. An interrogatory capacitance arrangement for use with an information storage system, the interrogatory capacitance arrangement including;

an irreversibly alterable information storage member including, a support member carrying a first conductive array comprising at least one conductive first pattern of predetermined configuration, at least one associated conductive first area, a connecting element interconnecting the first pattern and the associated first area and means totally encapsulating the first conductive array in non-conductive material, information being irreversibly recorded in the storage member by interrupting the connecting element between selected first areas and the associated first pattern;

a reference member including, means carrying a discontinuous second array comprising at least one conductive second pattern similar to the conductive first pattern of the storage member and at least one associated conductive second area similar to the conductive first area of the storage member, the relative positions of the first and second arrays being such that on presenting the storage member to the reference member and applying electrical signals to the second areas of the reference member the interrogative capacitance action is obtained by capacitive inter-coupling action between a first area connected to a first pattern and the respective second area associated with that first area.

2. An interrogatory capacitance arrangement as claimed in claim 1, in which the first pattern comprises a relatively large conductive area central of its support member with connecting elements selectively extending to a plurality of small conductive areas each constituting a said first area.

3. An interrogatory capacitance arrangement as claimed in claim 2 in which one small conductive area is always connected to the larger central conductive area of the alterable storage member regardless of stored information and the corresponding small area of the reference member will be in juxtaposition therewith when the alterable storage member is correctly located relative to the reference member.

4. An interrogatory capacitance arrangement as claimed in claim 1, in which the alterable storage member is precoded by omitting from the first conductive array of at least one predetermined said connecting element.

5. An interrogatory capacitive arrangement as claimed in claim 1, in which the first conductive array has that surface to be presented to the reference member encapsulated by a non-conductive material of a desired dielectric property.

* * * * *